United States Patent
Hicks, III et al.

(10) Patent No.: US 9,191,711 B2
(45) Date of Patent: Nov. 17, 2015

(54) APPARATUS AND METHOD FOR PROVIDING SERVICES USING A SERVICES GATEWAY

(75) Inventors: John Alson Hicks, III, Roswell, GA (US); Nicholas S. Huslak, Johns Creek, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 553 days.

(21) Appl. No.: 12/836,679

(22) Filed: Jul. 15, 2010

(65) Prior Publication Data
US 2012/0017253 A1    Jan. 19, 2012

(51) Int. Cl.
| | |
|---|---|
| *H04N 7/173* | (2011.01) |
| *H04N 21/478* | (2011.01) |
| *H04N 21/41* | (2011.01) |
| *H04N 21/654* | (2011.01) |
| *H04N 21/658* | (2011.01) |
| *H04N 21/81* | (2011.01) |

(52) U.S. Cl.
CPC ..... *H04N 21/47815* (2013.01); *H04N 21/4122* (2013.01); *H04N 21/654* (2013.01); *H04N 21/6581* (2013.01); *H04N 21/8173* (2013.01)

(58) Field of Classification Search
CPC ............ H04L 12/2812; H04L 12/2825; H04L 12/2834; H04L 12/2836; H04L 12/66; H04N 21/43615
USPC .................................................... 725/74–104
See application file for complete search history.

(56) References Cited

U.S. PATENT DOCUMENTS

| | | | | |
|---|---|---|---|---|
| 4,890,168 | A * | 12/1989 | Inoue et al. | 386/343 |
| 6,005,861 | A * | 12/1999 | Humpleman | 370/352 |
| 6,317,884 | B1 * | 11/2001 | Eames et al. | 709/217 |
| 6,732,366 | B1 * | 5/2004 | Russo | 725/5 |
| 6,871,188 | B2 * | 3/2005 | De Souza | 705/26.8 |
| 7,209,945 | B2 | 4/2007 | Hicks, III | |
| 7,992,178 | B1 * | 8/2011 | Nathan et al. | 725/93 |
| 8,250,614 | B1 * | 8/2012 | Ellis et al. | 725/87 |
| 8,555,331 | B2 * | 10/2013 | Limbasia | 725/142 |
| 2002/0019984 | A1 * | 2/2002 | Rakib | 725/111 |
| 2005/0144645 | A1 * | 6/2005 | Casey et al. | 725/95 |
| 2005/0229203 | A1 * | 10/2005 | Jutzi | 725/14 |
| 2006/0236357 | A1 * | 10/2006 | Walker et al. | 725/105 |
| 2007/0250900 | A1 * | 10/2007 | Marcuvitz | 725/141 |
| 2007/0283381 | A1 * | 12/2007 | Sidi et al. | 725/32 |
| 2008/0168519 | A1 * | 7/2008 | Rao et al. | 725/127 |
| 2008/0168523 | A1 * | 7/2008 | Ansari et al. | 725/131 |

(Continued)

*Primary Examiner* — Mushfikh Alam
(74) *Attorney, Agent, or Firm* — Guntin & Gust, PLC; Joseph P. Hrutka

(57) ABSTRACT

A system that incorporates teachings of the present disclosure may include, for example, a server having a controller operable to provide media content to a gateway for presentation on a plurality of display devices without using a set top box, provide a selection of available services for presentation on the plurality of display devices, receive from the gateway a request for a service chosen from the selection of available services where the service is not a telecommunication service, provide an executable software to the gateway for implementation of the service, and generate a shipping order in response to the request, where the shipping order instructs delivery of equipment associated with the service to a building in which the gateway is located, where the equipment is detected by the gateway when the equipment is connected to a powerline of the building, and where the service is implemented using the gateway. Other embodiments are disclosed.

20 Claims, 12 Drawing Sheets

Services Gateway Ecosystem

(56) References Cited

U.S. PATENT DOCUMENTS

| | | |
|---|---|---|
| 2008/0205419 A1 | 8/2008 | Shin et al. |
| 2008/0267076 A1* | 10/2008 | Laperi et al. ............... 370/242 |
| 2008/0271106 A1* | 10/2008 | Patel .............................. 725/118 |
| 2010/0005496 A1* | 1/2010 | Ellis et al. ..................... 725/87 |
| 2010/0313226 A1* | 12/2010 | Cholas et al. ................. 725/92 |
| 2010/0325672 A1* | 12/2010 | Barnett et al. ................. 725/81 |
| 2011/0126104 A1* | 5/2011 | Woods et al. ................. 715/719 |
| 2011/0219419 A1* | 9/2011 | Reisman ....................... 725/112 |
| 2012/0240177 A1* | 9/2012 | Rose ............................. 725/116 |
| 2013/0042266 A1* | 2/2013 | Roberts et al. ................ 725/37 |
| 2013/0185747 A1* | 7/2013 | Candelore et al. ............ 725/28 |
| 2013/0191855 A1* | 7/2013 | Godas ............................ 725/22 |

* cited by examiner

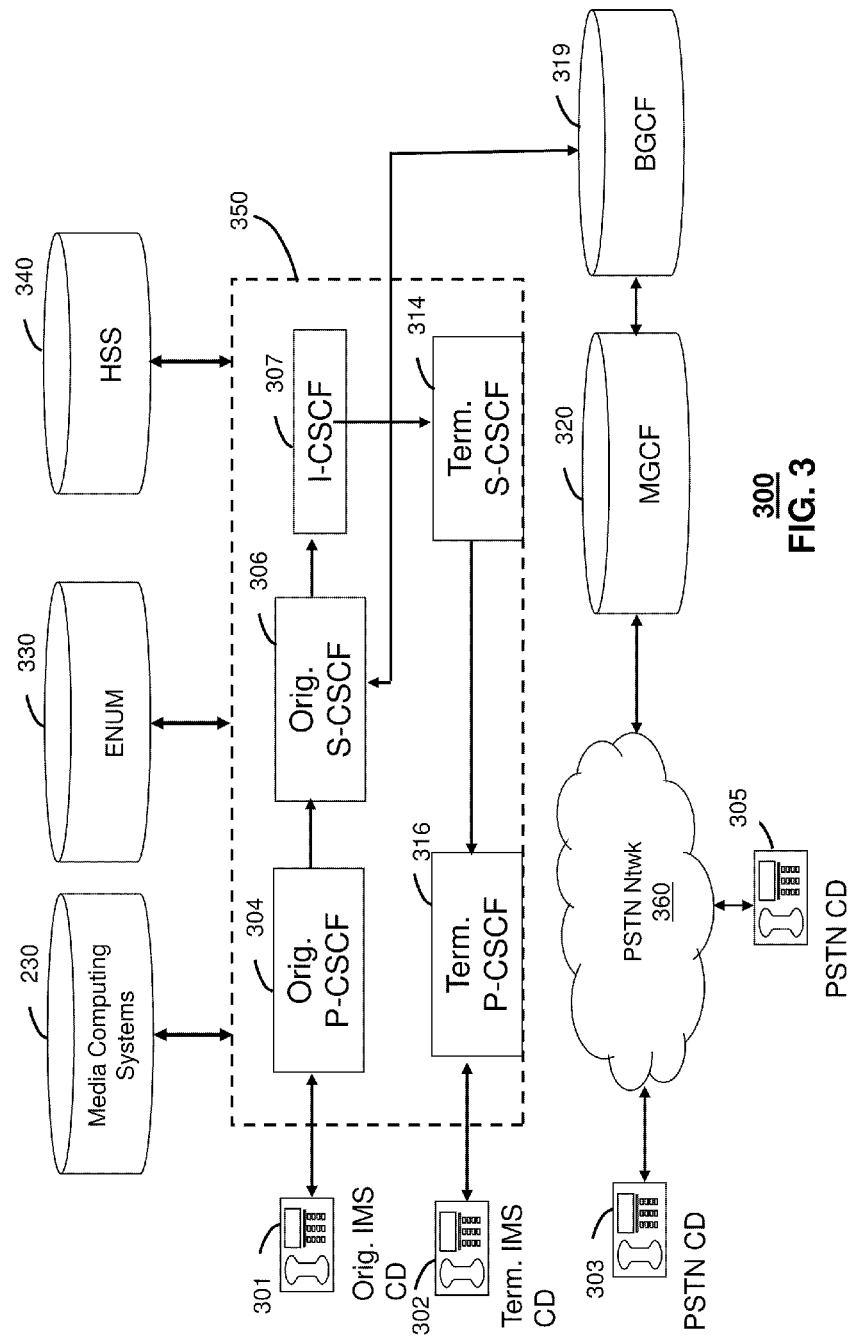

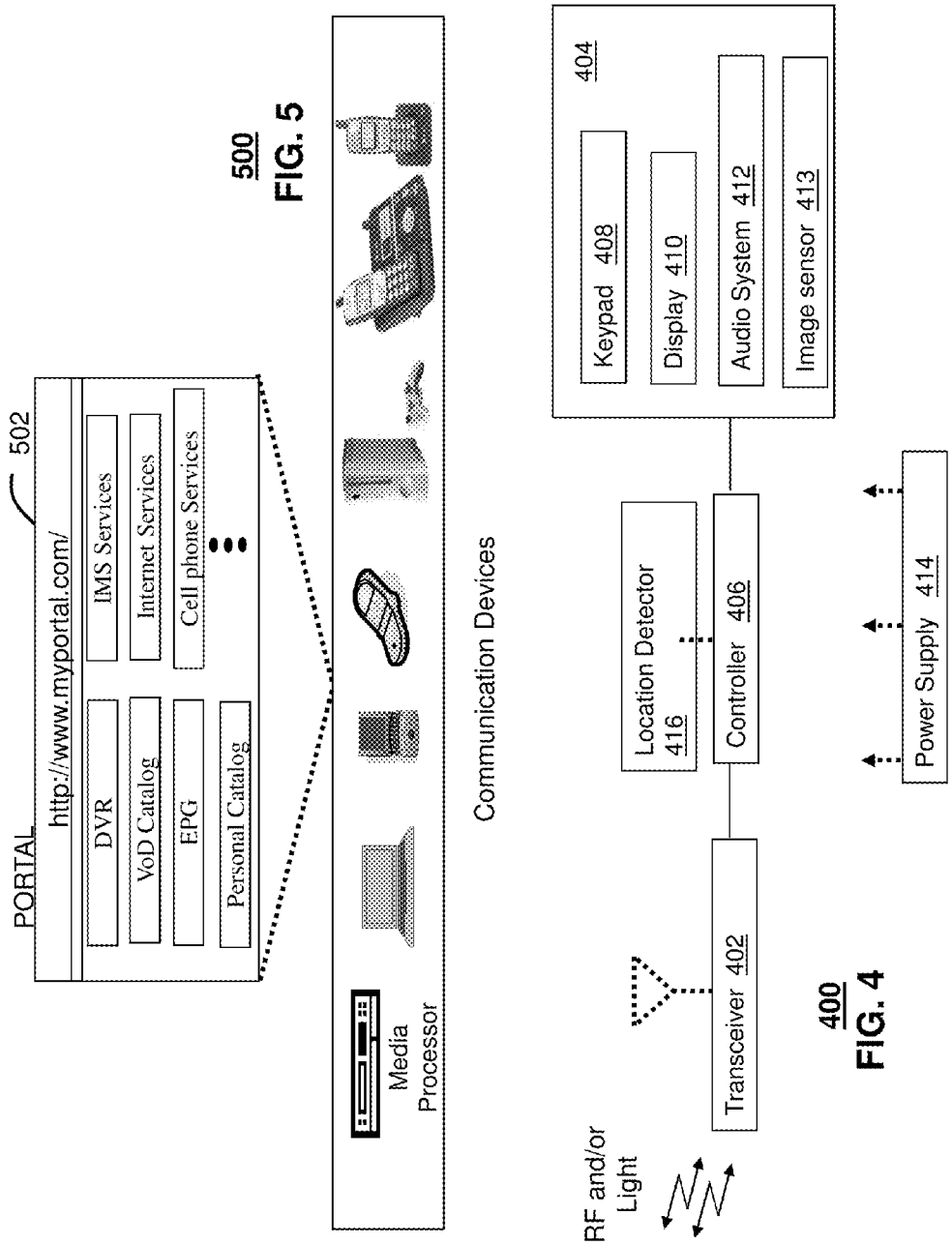

700

900

1100

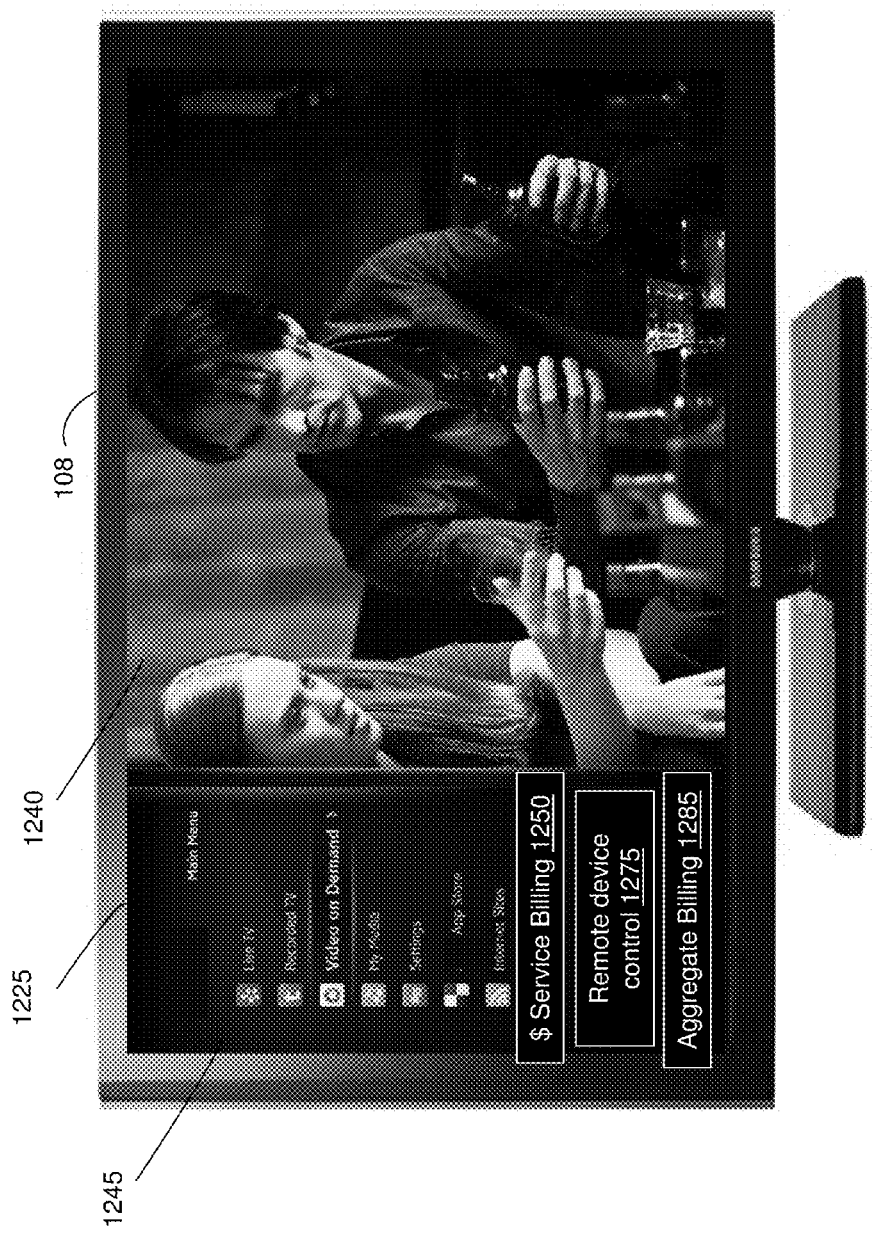

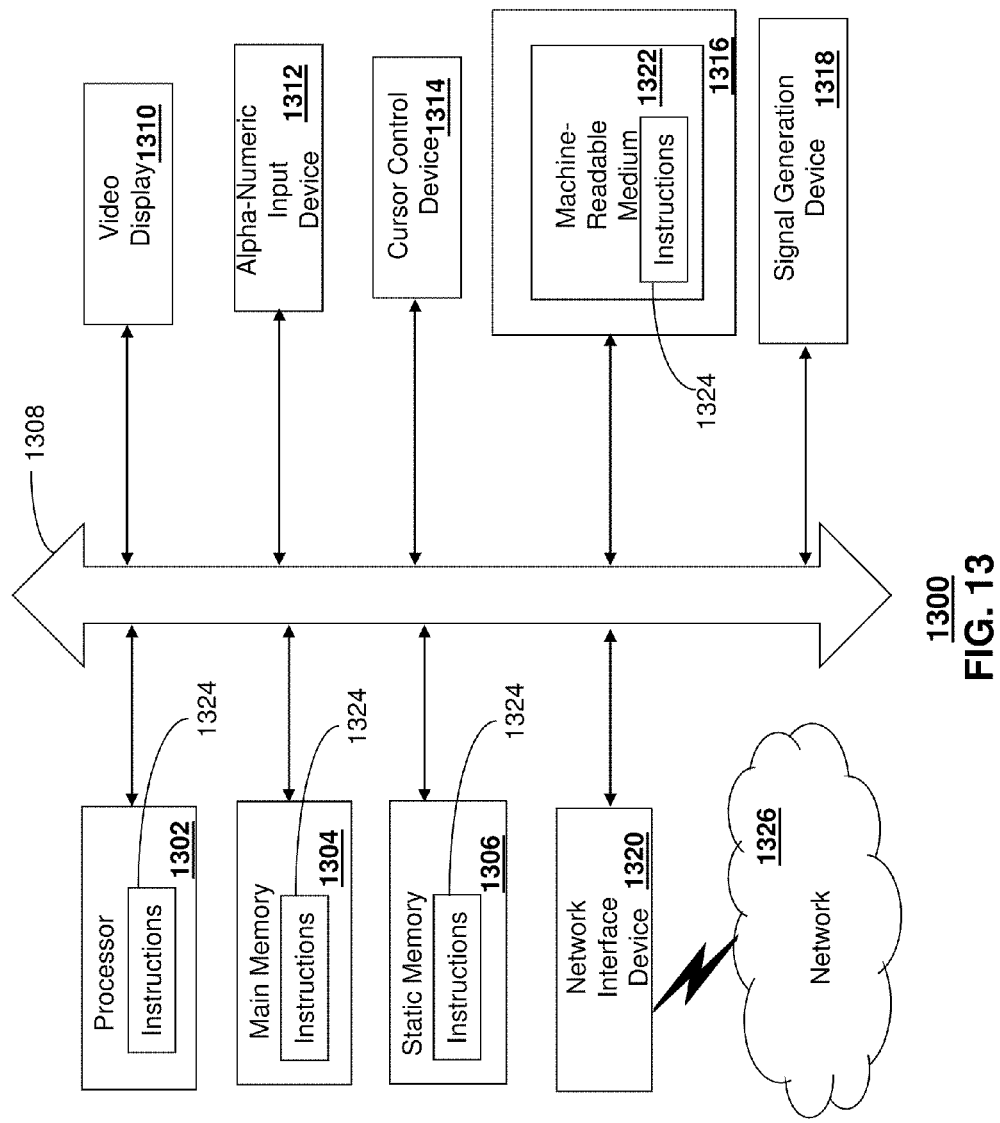

APPARATUS AND METHOD FOR PROVIDING SERVICES USING A SERVICES GATEWAY

FIELD OF THE DISCLOSURE

The present disclosure relates generally to communication systems and more specifically to an apparatus and method for providing services.

BACKGROUND

Media consumption has become a multibillion dollar industry that continues to grow rapidly. Collectively, improvements in viewing, audio, and communication technologies are causing rapid demand for consumption of all types of media content.

Media content may be delivered to consumers from service providers using various delivery techniques. Consumers are faced with a wide variety of providers from which to choose. While these providers often have overlapping services, there is often one or more services that are exclusive to a particular provider.

BRIEF DESCRIPTION OF THE DRAWINGS

FIGS. 1-3 depict illustrative embodiments of communication systems that provide media services;

FIG. 4 depicts an illustrative embodiment of a communication device utilized in the communication systems of FIGS. 1-3;

FIG. 5 depicts an illustrative embodiment of a portal interacting with the communication systems of FIGS. 1-3;

FIG. 12 depicts an illustrative embodiment of a Graphical User Interface that can be used in the devices and systems of FIGS. 1-8 and 11; and FIG. 13 is a diagrammatic representation of a machine in the form of a computer system within which a set of instructions, when executed, may cause the machine to perform any one or more of the methodologies discussed herein.

DETAILED DESCRIPTION

One embodiment of the present disclosure can entail a server having a controller operable to provide media content to a gateway for presentation on a plurality of display devices without using a set top box. The controller is operable to provide a selection of available services for presentation on the plurality of display devices and receive from the gateway a request for a service chosen from the selection of available services where the service is not a telecommunication service. The controller is also operable to provide an executable software to the gateway for implementation of the service and generate a shipping order in response to the request. The shipping order can instruct delivery of equipment associated with the service to a building in which the gateway is located. The equipment can be detected by the gateway when the equipment is connected to a powerline of the building. The service can be implemented using the gateway.

One embodiment of the present disclosure can entail a non-transitory computer-readable storage medium operating in a gateway, comprising computer instructions to receive media content for presentation on a plurality of display devices. The computer instructions can provide the media content to the plurality of display devices without using a set top box and in a transport format compatible with each of the plurality of display devices. The computer instructions can also provide a Graphical User Interface (GUI) for presentation on the plurality of display devices where the GUI comprises a selection of available services. The computer instructions can further receive a request from one of the plurality of display devices for a service chosen from the selection of available services, and receive an application resource bundle from a remote server for implementation of the service. The computer instructions can also detect a presence of equipment associated with the service, and implement the service using the application resource bundle and the equipment.

Figure 1:
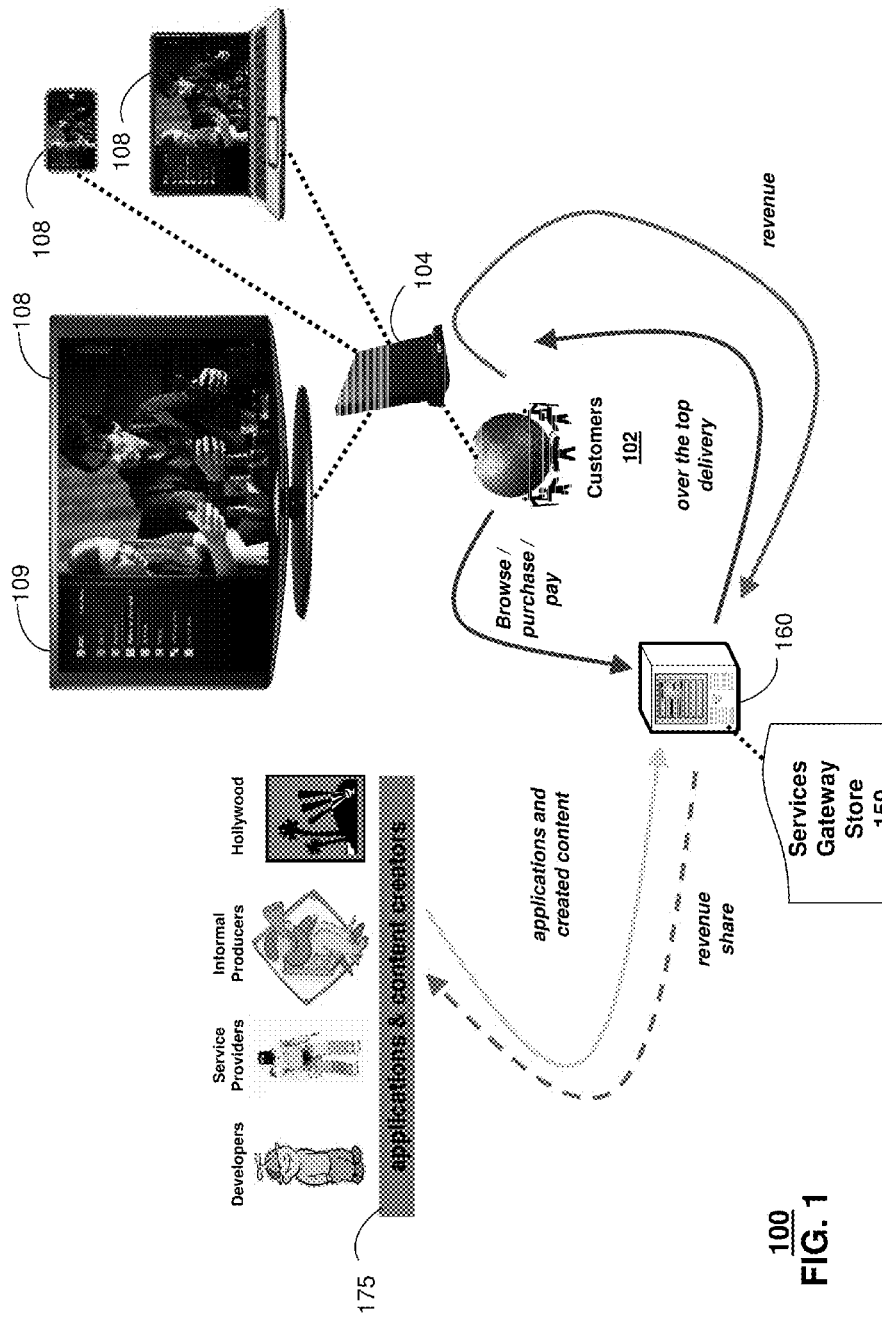

One embodiment of the present disclosure can entail a method including providing media content from a network of a first service provider to a gateway where the media content is presentable by a plurality of display devices in communication with the gateway. The method can also include providing a selection of available services to the gateway for presentation in a Graphical User Interface (GUI) on the plurality of display devices where at least one of the available services is associated with a second service provider that is different from the first service provider. The method can further include receiving a request for a service from the selection of available services where the service is associated with the second service provider, and providing an application resource bundle to the gateway to implement the service. A purchase of the service can be based on at least one of: charging an account associated with the first service provider, and not identifying the second service provider FIG. 1 depicts an illustrative embodiment of a first communication system 100 for providing a variety of services to consumers 102, including delivering media content. System 100 can include a services gateway store 150 generated by service provider equipment 160, such as one or more servers that maintain a website for interaction with the consumers 102. The services gateway store 150 can also allow for delivery of content and applications to customers via a gateway 104, such as applications and content being provided by a variety of creators 175, including developers, services providers, informal producers, professional producers, and so forth.

In one embodiment, each of the customers 102 can be provisioned with the services gateway 104 that includes a Java-based Application Execution Environment for in-home execution of applications. A software development kit for the gateway 104 can be provided for use by the service provider, as well as third party developers. Applications can be downloaded from a Services Management System (not shown) in the network and automatically installed and provisioned on the Services Gateway 104.

The Services Gateway Store 150 or a Call Center allows customers to subscribe to services, such home security, remote monitoring and home automation & control; purchase or rent multimedia content and/or purchase or rent equipment.

The gateway 104 can include one or more of the following: an application execution environment for receiving media content or other data in one or more formats or protocols; Java virtual machine and/or software development kits for $3^{rd}$ party application development associated with the gateway 104; an operating system such as a Linux OS; encryption engine such as a Crypto Engine; VoIP ATA Function and multiple (e.g., two) ports; Digital Living Network Alliance (DLNA) media server; and multiple (e.g., four) port Ethernet Switch.

The gateway 104 can also include one or more of the following: USB ports; various interfaces (e.g., WAN Ethernet, ADSL2+ and VDSL2; 802.11b/g/n communication capability); G.hn or other communication protocol for delivery over powerline, coax and telephone wiring; ZigBee communication capability; remote management, maintenance and downloading; plug-in module capability including hard drive, Femtocell mobile base station; and HD Voice Digital Enhanced Cordless Telecommunications (DECT) base station.

The gateway 104 can provide one or more of the following services: video such as direct broadcast satellite, Video-on-Demand, Off-the-Air TV, Over-the-Top TV, IPTV, and so forth; and voice, such as VoIP and Femtocell. The gateway 104 can also provide one or more of the following services: DLNA media server with network backup (photos, music, and video); home monitoring, automation and control; third-party monitored home security; remote utility meter reading; and remote medical monitoring.

In one embodiment, when a services gateway 104 is installed at a residence or other location, applications can be automatically downloaded from a service management system, installed and provisioned. In another embodiment, when a customer signs up for a new service, the new application can be automatically downloaded from a component management system, installed and provisioned. In yet another embodiment, the applications, whether they are associated with the service provider or with a third party vendor, can be downloaded to the services gateway 104 without user intervention. In another embodiment, third party services, including telecommunication services and/or non-telecommunication services, can be provided to a customer without providing the identity of the third party. For instance, the third party service can be billed to the customer using aggregate billing with the communication services. In one embodiment, Java bundles can be provided to the gateway 104 to implement a service. In another embodiment, the services can be implemented using software downloaded to the gateway 104 and/or software accessed by the gateway from a software source that is remote from the gateway. When a particular service is cancelled or suspended, the corresponding application can be disabled or removed from a memory accessible to the gateway 104.

In one embodiment, system 100 provides for developing, offering and delivering services to customers that require Java bundles to be downloaded and installed from a network platform onto the services gateway 104 in the customer's home. If a new service requires additional hardware, the additional hardware can be shipped to the customer and installed by the customer, including by way of step-by-step instructions provided through the downloaded applications. The present disclosure also contemplates installation by service technicians.

System 100 allows for customers 102 to browse, purchase and pay for devices, content, applications and/or services at the services gateway store 150. These devices, content, applications and/or services can be provided to, or otherwise be made accessible to, the services gateway store 150 by the creators 150. The services gateway store 150 can perform over the top delivery of these items and generate revenue as a result. The service provider maintaining the services gateway store 150 can then engage in revenue sharing with the creators 175 of the particular item that has been purchased by the customer via the services gateway store (or a Call Center) through use of the customer's services gateway 104.

In one embodiment, the system 100 can be utilized for providing non-telecommunication services, such as in-home automation and control. For instance, the service provider can offer an automated device for use in the home, such as a pet feeding device. When a customer purchases the pet feeding device, such as through the services gateway store 150, the service provider would download and install a Java bundle onto the customer's services gateway 104 corresponding to the pet feeder device. The present disclosure also contemplates the purchase being made elsewhere such as via a Call Center of the service provider or at a store (website or physical location) of a third party selling the pet feeder.

The pet feeder device could then be shipped to the customer. This can be performed by automatically generating and transmitting a shipping order to the third party associated with the pet feeder device, in response to the purchase of the device. Once the customer receives the pet feeder device and plugs the pet feeder into AC power in the home, the services gateway 104 can automatically discover the pet feeder device, bind it to the pet feeder Java application that has already been automatically installed on the services gateway, and activate the corresponding service. The service could automatically be added to the customer's Services Guide 109, which is presented in a Graphical User Interface of a display device (e.g., a television) in the customer's residence or other location associated with the customer. For instance, the pet feeder service can be added to the vertical list of services on the left hand side of the screen. The service can enable the customer to access the pet feeder service via any device in communication with the service gateway 104, such as a TV, PC or mobile device. The service can enable the customer to easily turn on and off the pet feeder and setup a schedule for the pet feeder. The service could also enable the customer to have remote access to the pet feeder application when they are away from their home via a PC or web-enabled mobile device.

System 100 also allows for billing of the service through the services gateway 104 and the services gateway store 150. For example, at the time of purchase via the services gateway store 150, a charge for the device and/or service can be applied to an account associated with the particular customer. For instance, the service provider that is maintaining the services gateway store and providing telecommunication services (e.g., Internet, voice communication, media programming, and so forth) to the customer via the services gateway can provide the particular customer with an account for such telecommunication services. In one embodiment, the purchase of the automated device and/or service can be applied to the telecommunication services account of the customer. In this example, the purchase can be made without the need for the customer to communicate credit card and/or account information.

In another embodiment, the purchase of the automated device and/or service can be done without identifying the third party vendor associated with the particular device and/or service. Continuing with this example, after the initial purchase, monthly or other periodic service charges can be applied to the telecommunications account of the customer via the services gateway 104 without identifying the third party vendor.

The services Guide 109 can include all of the services that the user has subscribed to and which are being implemented via the services gateway 104. When a user subscribes to a new service it can automatically appear in the vertical navigation bar of any display devices in communication with the services gateway 104. The Services Guide 109 can be hosted on the services gateway 104 in the customer's home or on a network server. When the user accesses the Services Guide 109, it can be rendered in a format to match the capabilities of the communication device (e.g., screen size and resolution). The user experience across the plurality of communication devices in the residence or other building that are in communication with the services gateway 104 can have a common look and feel due to using the same or a similar version of the Services Guide 109.

System 100, via the services gateway 104, can utilize a common format or protocol for delivery of data to a plurality of communication devices (e.g., television, desktop computer, video gaming console, mobile cellular phone, camera, media player, and so forth) throughout the residence or other building.

In one embodiment, DLNA technology can be utilized by the services gateway 104, as well as other communication devices in the residence or building, to enable PC Internet, mobile and consumer electronics devices to find each other, communicate, share and display multimedia content while adhering to digital rights management associated with the media content. The DLNA technology can also be used for communications with respect to other devices in the building or residence, including devices that are not associated with telecommunication services, such as home appliances (e.g., refrigerator, washing machine, air-conditioner, and so forth) equipped with transceivers. In another embodiment, the services gateway 104 communicates directly with each of the communication devices or transceivers connected with other devices without using a set top box or other intermediary device.

Figure 2:
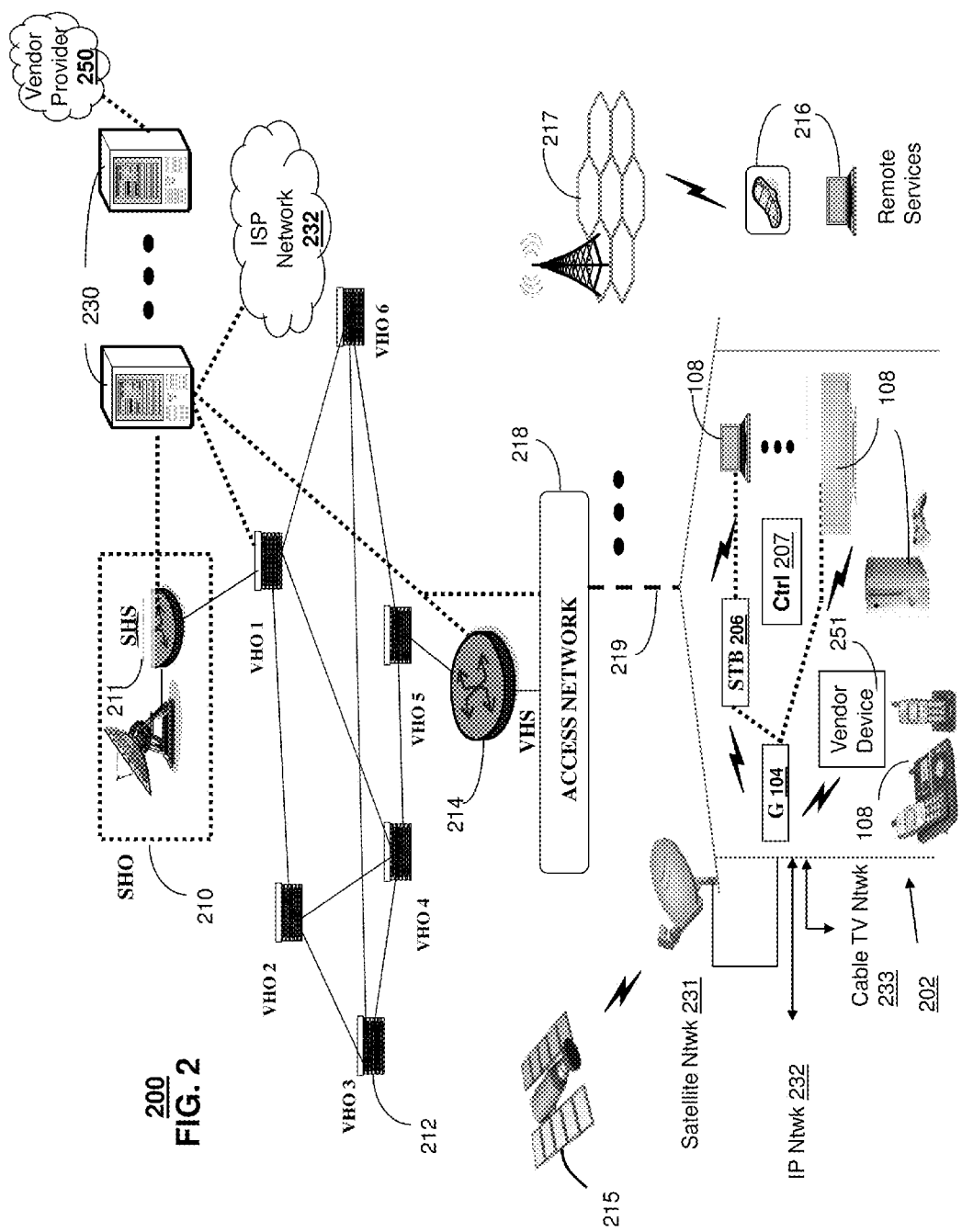

FIG. 2 depicts an illustrative embodiment of a second communication system 200 for delivering media content. Communication system 200 can be overlaid or operably coupled with communication system 100 as another representative embodiment of communication system 200.

The communication system 200 can represent an Internet Protocol Television (IPTV) broadcast media system although other media broadcast systems are contemplated by the present disclosure in combination with or in place of the IPTV system. The IPTV media system can include a super head-end office (SHO) 210 with at least one super headend office server (SHS) 211 which receives media content from satellite and/or terrestrial communication systems. In the present context, media content can represent audio content, moving image content such as videos, still image content, or combinations thereof. The SHS server 211 can forward packets associated with the media content to video head-end servers (VHS) 214 via a network of video head-end offices (VHO) 212 according to a common multicast communication protocol.

The VHS 214 can distribute multimedia broadcast programs via an access network 218 to commercial and/or residential buildings 202 housing a gateway 104 (such as a residential or commercial gateway). The access network 218 can represent a group of digital subscriber line access multiplexers (DSLAMs) located in a central office or a service area interface that provides broadband services over optical links or copper twisted pairs 219 to buildings 202. The gateway 104 can use common communication technology to distribute broadcast signals to communication devices capable of presenting the media content. In one embodiment, the gateway 104 can provide the media content directly to one or more display devices 108 without the use of a set top box or other media processor. In another embodiment, the gateway 104 can provide the media device to media processors 206 such as Set-Top Boxes (STBs) which in turn present broadcast channels to media devices 108 such as computers, television sets, gaming consoles managed in some instances by a media controller 207 (such as an infrared or RF remote control, gaming controller, etc.). The exemplary embodiments contemplate home networks that have display devices without any set top boxes; home networks that have display devices with and without set top boxes; and home networks that have display devices which each having a set top box. The present disclosure contemplates one or more of the display devices 108 receiving the media content directly without the use of the STB's 206 and/or one or more of the display devices 108 receiving the media content from the STB's.

In one embodiment, the system 200 allows for content to be presented that is aggregated from multiple sources. The system 200 can provide the services gateway 104 to convert a plurality of proprietary protocols of the media content to standard DLNA protocol or another standard protocol that allows for universal delivery of media content to one or more display devices, such as utilizing a common format for delivering the media content from the gateway to each of the display devices located in the building 202, including different types of display devices such as a TV, a cell phone, a desktop computer, and so forth.

In another embodiment, the service provider can provide an open approach to application development such that the services gateways are provided with a Software Development Kit (SDK) or other tool for facilitating third party application development that is usable with the services gateway 104. In one embodiment, a certification process can be established for applications developed by the third party for the service gateway 104 prior to offering the application for sale, such as through an application store managed by the service provider. A services gateway store, whether on-line or a physical location, can be used by content creators or application developers to deliver applications and services.

In one embodiment, the gateway 104 and/or the media or display devices 108 can utilize tethered interface technologies (such as coaxial, phone line, or powerline wiring) or can operate over a common wireless access protocol such as Wireless Fidelity (Wi-Fi). In another embodiment, the media processor(s) 206 can utilize tethered interface technologies (such as coaxial, phone line, or powerline wiring) or can operate over a common wireless access protocol such as Wireless Fidelity (Wi-Fi). With these interfaces, unicast communications can be invoked from the subsystems of the IPTV media system for services such as video-on-demand (VoD), browsing an electronic programming guide (EPG), or other infrastructure services.

Some of the network elements of the IPTV media system can be coupled to one or more computing devices 230. All or a portion of the computing devices 230 can operate as a web server for providing portal services over an Internet Service Provider (ISP) network 232 to wireline media devices 108 or wireless communication devices 216 (e.g., cellular phone, laptop computer, etc.) by way of a wireless access base station 217 operating according to common wireless access protocols such as Wi-Fi, or cellular communication technologies (such as GSM, CDMA, UMTS, WiMAX, Software Defined Radio or SDR, and so on).

The computing devices 230 can be in communication with one or more vendors or other service providers 250 for providing additional services to the building 202. The additional services from the vendor providers 250 can be telecommunication services and/or can be non-telecommunication services, including other utilities, medical monitoring, home security, home automation, and so forth. For example, the computing devices 230 can be in communication with one or more utility service providers 250, such as the power company or water company, to enable communication between the other provider and the building 202.

For instance, remote monitoring can be performed by a utility service provider 250 through use of the gateway 104. Data associated with the utility service being provided at the building 202 can be communicated to the utility service provider 250, including consumption. This data can be used by the utility service provider 250 for a number of functions, including billing, remote control (e.g., powering down certain appliances having remote control units attached thereto to avoid a brown out in the region), and providing information to the customer (e.g., consumption statistics and instructions on how to reduce the costs). In another embodiment, the data can be retrieved by the gateway 104 and presented or otherwise utilized at the building 202 without transmitting the data to the particular service provider 250. For instance, medical monitoring using medical devices 251 in communication with the gateway 104 can be performed where the medical data is transmitted from the medical devices to the gateway 104 and presented or otherwise utilized by the gateway without the gateway transmitting the medical data outside of the building 202. The medical data can be utilized in various ways, such as presentation of the medical data on the display devices 108, providing information that is triggered based on the medical data meeting particular thresholds, and so forth. In another embodiment, the remote monitoring can include parallel or backup communication means, such as direct communication (e.g., wired and/or wireless) between the service provider 250 and its device 251 located in the building 202 in the event that the gateway 104 is unable to communicate the data to the service provider.

In one embodiment, the data can be used for aggregate billing. For instance, billing for two or more different service providers can be included in the same bill, such as a bill for satellite and IPTV services or a bill for Internet access and electricity. The aggregate billing can be between different service providers in a similar services type or can be for different service providers in different service types. In one embodiment, the remote monitoring can be utilized to provide the customer with real-time information related to the services received. For example, a real-time energy consumption GUI can be provided that presents the current consumption and current cost as it is being incurred.

In another embodiment, a satellite broadcast television system can be used in addition to, or in place of, the IPTV media system. In this embodiment, signals transmitted by a satellite 215 carrying media content can be intercepted by a common satellite dish receiver 231 coupled to the building 202. Modulated signals intercepted by the satellite dish receiver 231 can be transferred to the gateway 104 for decoding and distributing broadcast channels to the media devices 108. The media processors 206 can be equipped with a broadband port to the IP network 232 to enable services such as VoD and EPG described above.

In yet another embodiment, an analog or digital broadcast distribution system such as cable TV system 233 can be used in addition to, or in place of, the IPTV media system described above. In this embodiment, the cable TV system 233 can provide Internet, telephony, and interactive media services.

In one embodiment, the gateway 104 can selectively bypass the set top box 206 and deliver the media content directly to the display device 108. For example, the gateway 104 can determine a type or format of media content that is being received and can determine if the media content is compatible with a set top box 206 connected with a particular display device 108. If there is an incompatibility determined, then the gateway 104 can bypass the set top box 206 and deliver the media content directly to the display device 108. In another example, the gateway 104 can determine the compatibility issue and can reformat the media content for delivery based on the compatibility determination.

It is contemplated that the present disclosure can apply to any present or next generation over-the-air and/or landline media content services system.

FIG. 3 depicts an illustrative embodiment of a third communication system 300 employing an IP Multimedia Subsystem (IMS) network architecture to facilitate the combined services of circuit-switched and packet-switched systems. Communication system 300 can be overlaid or operably coupled with communication systems 100 and 200 as another representative embodiment of communication system 300.

Communication system 300 can comprise a Home Subscriber Server (HSS) 340, a tElephone NUmber Mapping (ENUM) server 330, and other common network elements of an IMS network 350. The IMS network 350 can establish communications between IMS compliant communication devices (CD) 301, 302, Public Switched Telephone Network (PSTN) CDs 303, 305, and combinations thereof by way of a Media Gateway Control Function (MGCF) 320 coupled to a PSTN network 360. The MGCF 320 is generally not used when a communication session involves IMS CD to IMS CD communications. Any communication session involving at least one PSTN CD may utilize the MGCF 320.

IMS CDs 301, 302 can register with the IMS network 350 by contacting a Proxy Call Session Control Function (P-CSCF) which communicates with a corresponding Serving CSCF (S-CSCF) to register the CDs with the HSS 340. To initiate a communication session between CDs, an originating IMS CD 301 can submit a Session Initiation Protocol (SIP INVITE) message to an originating P-CSCF 304 which communicates with a corresponding originating S-CSCF 306. The originating S-CSCF 306 can submit queries to the ENUM system 330 to translate an E.164 telephone number in the SIP INVITE to a SIP Uniform Resource Identifier (URI) if the terminating communication device is IMS compliant.

The SIP URI can be used by an Interrogating CSCF (I-CSCF) 307 to submit a query to the HSS 340 to identify a terminating S-CSCF 314 associated with a terminating IMS CD such as reference 302. Once identified, the I-CSCF 307 can submit the SIP INVITE to the terminating S-CSCF 314. The terminating S-CSCF 314 can then identify a terminating P-CSCF 316 associated with the terminating CD 302. The P-CSCF 316 then signals the CD 302 to establish communications.

If the terminating communication device is instead a PSTN CD such as references 303 or 305, the ENUM system 330 can respond with an unsuccessful address resolution which can cause the originating S-CSCF 306 to forward the call to the MGCF 320 via a Breakout Gateway Control Function (BGCF) 319. The MGCF 320 can then initiate the call to the terminating PSTN CD by common means over the PSTN network 360.

The aforementioned communication process is symmetrical. Accordingly, the terms "originating" and "terminating" in FIG. 3 are interchangeable. It is further noted that communication system 300 can be adapted to support video conferencing. In addition, communication system 300 can be adapted to provide the IMS CDs 301, 303 the multimedia and Internet services of communication systems 100 and 200.

The first and/or second communication systems 100 and/or 200 can be operatively coupled to the third communication system 300 by way of computing devices 230 (or other common communication means) to interchangeably share services between said systems. The first, second and/or third communication systems 100, 200 and/or 300 can be used for multimedia communication sessions using multiple services providers and using circuit-switched and packet-switched communications. The computing devices 230 can implement third party services at a residence 202 using the gateway 104 through downloading of a java bundle or other resource application bundle to the gateway. In one embodiment, this can be performed without identifying the third party vendor and/or without intervention by the user. System 300 allows for both circuit-switched and packet-switched communication services to be implemented at the residence 202.

FIG. 4 depicts an exemplary embodiment of a communication device 400. Communication device 400 can serve in whole or in part as an illustrative embodiment of the communication devices of FIGS. 1-2 and other communication devices described herein. The communication device 400 can comprise a wireline and/or wireless transceiver 402 (herein transceiver 402), a user interface (UI) 404, a power supply 414, a location detector 416, and a controller 406 for managing operations thereof. The transceiver 402 can support short-range or long-range wireless access technologies such as infrared, Bluetooth, Wi-Fi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, SDR, and next generation cellular wireless communication technologies as they arise. The transceiver 402 can also be adapted to support circuit-switched wireline access technologies (such as PSTN), packet-switched wireline access technologies (such as TCPIP, VoIP, etc.), and combinations thereof.

The UI 404 can include a depressible or touch-sensitive keypad 408 with a navigation mechanism such as a roller ball, joystick, mouse, or navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric dialing keypad commonly used by phones, and/or a Qwerty keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display 410.

The UI 404 can also include an audio system 412 that utilizes common audio technology for conveying low volume audio (such as audio heard only in the proximity of a human ear) and high volume audio for hands free operation. The audio system 412 can further include a microphone for receiving audible signals from an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and charging system technologies for supplying energy to the components of the communication device 400 to facilitate long-range or short-range portable applications. The location detector 416 can utilize common location technology such as a global positioning system (GPS) receiver for identifying a location of the communication device 400 based on signals generated by a constellation of GPS satellites, thereby facilitating common location services such as navigation.

The communication device 400 can use the transceiver 402 to also determine a proximity to a cellular, Wi-Fi or Bluetooth access point by common power sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such as a Flash, ROM, RAM, SRAM, DRAM or other storage technologies.

The communication device 400 can be adapted to perform the functions of the media processor 206, the media devices 108, or the portable communication devices 216 of FIGS. 1 and 2, as well as the IMS CDs 301-302 and PSTN CDs 303-305 of FIG. 3. It will be appreciated that the communication device 400 can also represent other common devices that can operate in communication systems 100-300 of FIGS. 1-3 such as a gaming console and a media player.

FIG. 5 depicts an illustrative embodiment of a portal 502 which can operate from the computing devices 130 described earlier of communication systems 100 and 200 illustrated in FIGS. 1 and 2. The portal 502 can be used for managing services of communication systems 100-200. The portal 502 can be accessed by a Uniform Resource Locator (URL) with a common Internet browser using an Internet-capable communication device such as those illustrated FIGS. 1-2. The portal 502 can be configured, for example, to access a media processor 106 and services managed thereby such as a Digital Video Recorder (DVR), a VoD catalog, an EPG, a video gaming profile, a personal catalog (such as personal videos, pictures, audio recordings, etc.) stored in the media processor, to provision IMS services described earlier, to provision Internet services, to provision cellular phone services, and so on.

Figure 6:
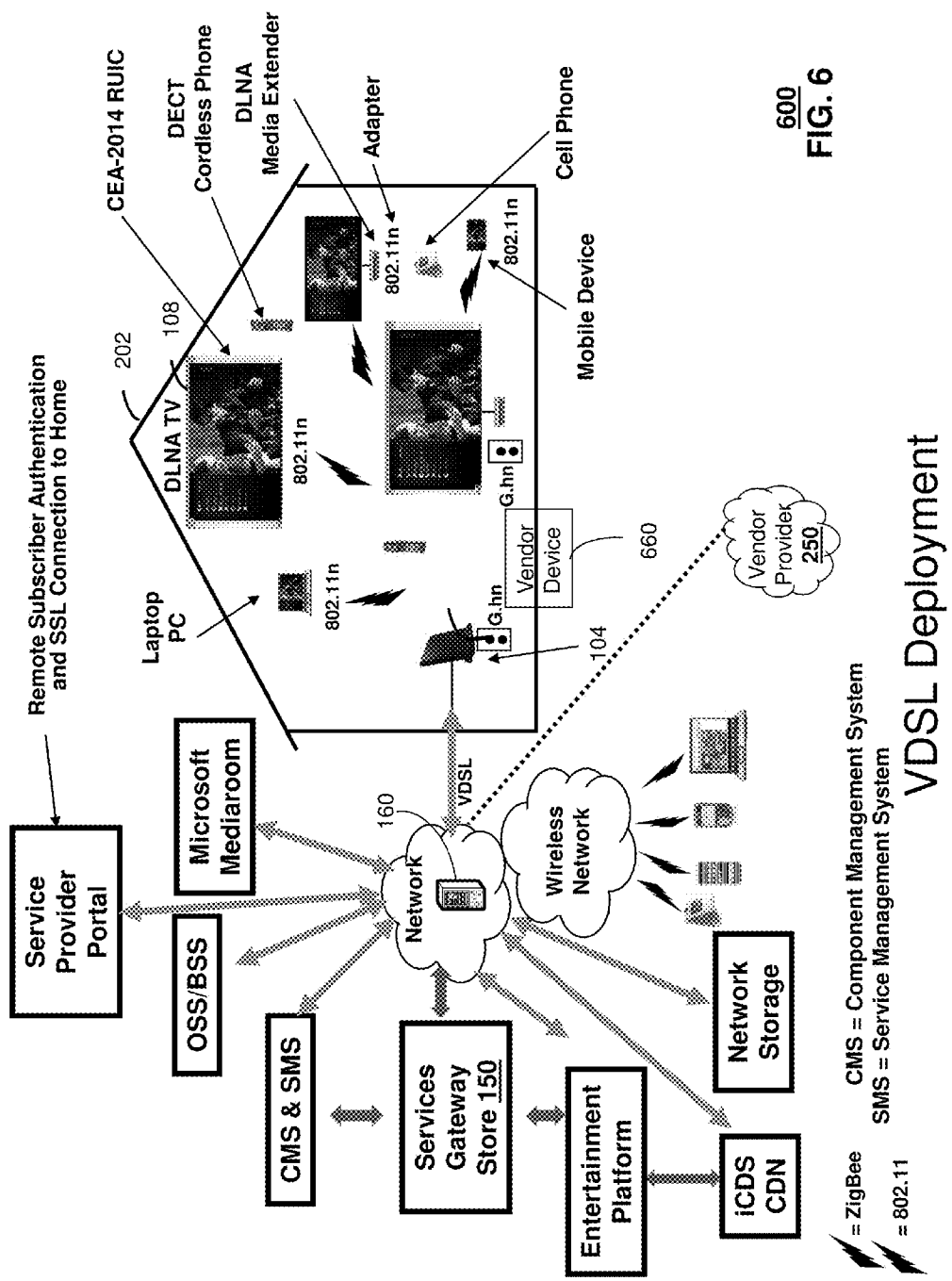
FIGS. 6-8 depict illustrative embodiments of communication systems that provide media services.

FIG. 6 depicts an illustrative embodiment of a communication system 600 employing an in-region VDSL deployment of the services gateway 104. Communication system 600 can be overlaid or operably coupled with one or more of communication systems 100-300 as another representative embodiment of communication system 600. Multimedia content from a plurality of different service providers using a plurality of different delivery protocols can be delivered via the gateway 104 directly to one or more display devices 108 in the residence 202. Communication between the gateway 104 and the display devices 108 can be via various means including hardwire, via Ethernet over Cat5e/Cat6 cable, HomePlug over powerline or G.hn protocol over powerline, coax or telephone wiring, or wireless 802.11 protocol. The gateway 104 can convert media content delivered via different protocols to a common format deliverable directly to each of the display devices 108 without using a set top box. A java bundle or other resource bundle can be downloaded to the gateway 104. A shipping order can be automatically generated for equipment associated with a requested service and can be delivered to the requestor. The equipment can be detected once powered up or plugged into a power circuit of the building 202. Upon detection of the equipment, the requested service can be implemented, such as without the intervention of the user, through use of the gateway 104.

In one embodiment, a server 160 is operable to provide media content to the gateway 104 for presentation on the plurality of display devices 108 without using a set top box. The server 160 can provide a selection of available services for presentation on the plurality of display devices 108 and can receive from the gateway 104 a request for a service chosen from the selection of available services, where the service is provided by a vendor 250 and the service is not a telecommunication service. The server 160 can provide a Java bundle to the gateway 104 for implementation of the service. The server 160 can generate a shipping order in response to the request. The shipping order can instruct delivery of equipment 660 associated with the service to a building 202 in which the gateway 104 is located, where the equipment is detected by the gateway when the equipment is connected to a powerline of the building (e.g., through G.hn protocol), and where the service is implemented using the gateway.

System 600 can also include a Service Provider Portal which enables a customer, when they are away from their home, with the ability to securely access the Services Gateway hosted services in their home. The customer could be authenticated on the Service Provider Portal via login and password and then all of their communications to their home could flow through a secure SSL connection to the home from the portal. In addition, remote access via wireless devices is contemplated, which could be cellular access or Wi-Fi Hotspot access using a PC or mobile device.

Figure 7:
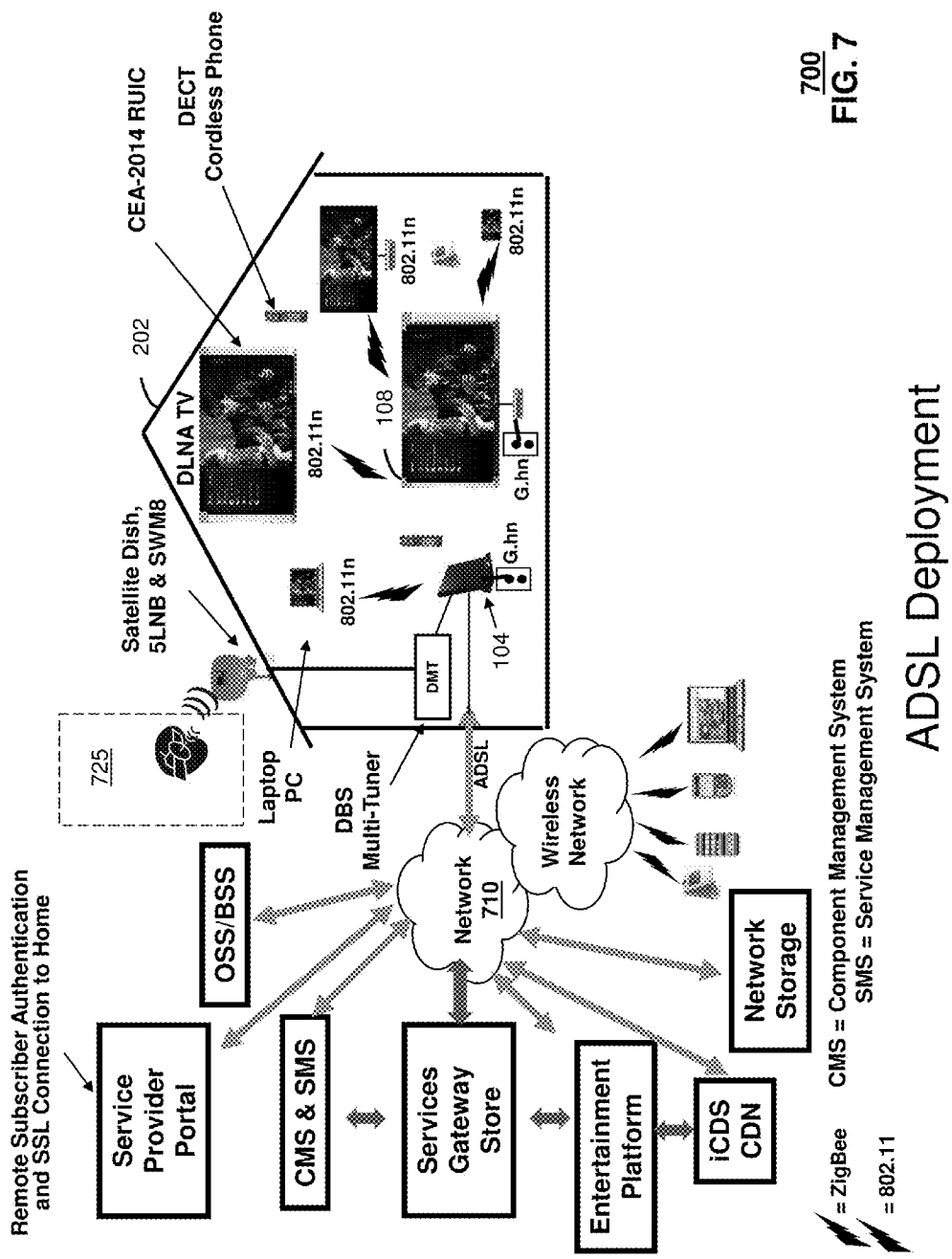

FIG. 7 depicts an illustrative embodiment of a communication system 700 employing an in-region ADSL deployment of the services gateway 104. Communication system 700 can be overlaid or operably coupled with one or more of communication systems 100-300 as another representative embodiment of communication system 700. Multimedia content from a plurality of different service providers using a plurality of different delivery protocols can be delivered via the gateway 104 directly to one or more display devices 108 in the residence 202. In one embodiment, a separate DBS multi-tuner can be utilized between a satellite dish and the gateway 104. Communication between the gateway 104 and the display devices 108 can be via various means including hardwire, via Ethernet over Cat5e/Cat6 cable, HomePlug over powerline or G.hn protocol over powerline, coax or telephone wiring, or wireless 802.11 protocol. Executable software, including a java bundle or other resource bundle, can be downloaded to the gateway 104. A shipping order can be automatically generated for equipment associated with a requested service and can be delivered to the requestor. The equipment can be detected once powered up or plugged into a power circuit of the building 202. Upon detection of the equipment, the requested service can be implemented, such as without the intervention of the user, through use of the gateway 104.

In one embodiment, media content from an IPTV network 710 of a first service provider can be delivered to the gateway 104 so that the media content can be presented by a plurality of display devices 108 in communication with the gateway. A selection of available services can be provided to the gateway 104 for presentation in a Graphical User Interface (GUI) on the plurality of display devices 108, where at least one of the available services is associated with a second service provider that is different from the first service provider, such as a satellite service provider 725. A request for a service can be made by a user at the residence 202, such as through one of the display devices 108, where the service is associated with the second service provider 725. An application resource bundle can be provided to the gateway 104 in response to the request to implement the service. A purchase of the service can be based on at least one of: charging an account associated with the first service provider, and not identifying the second service provider 725.

Figure 8:
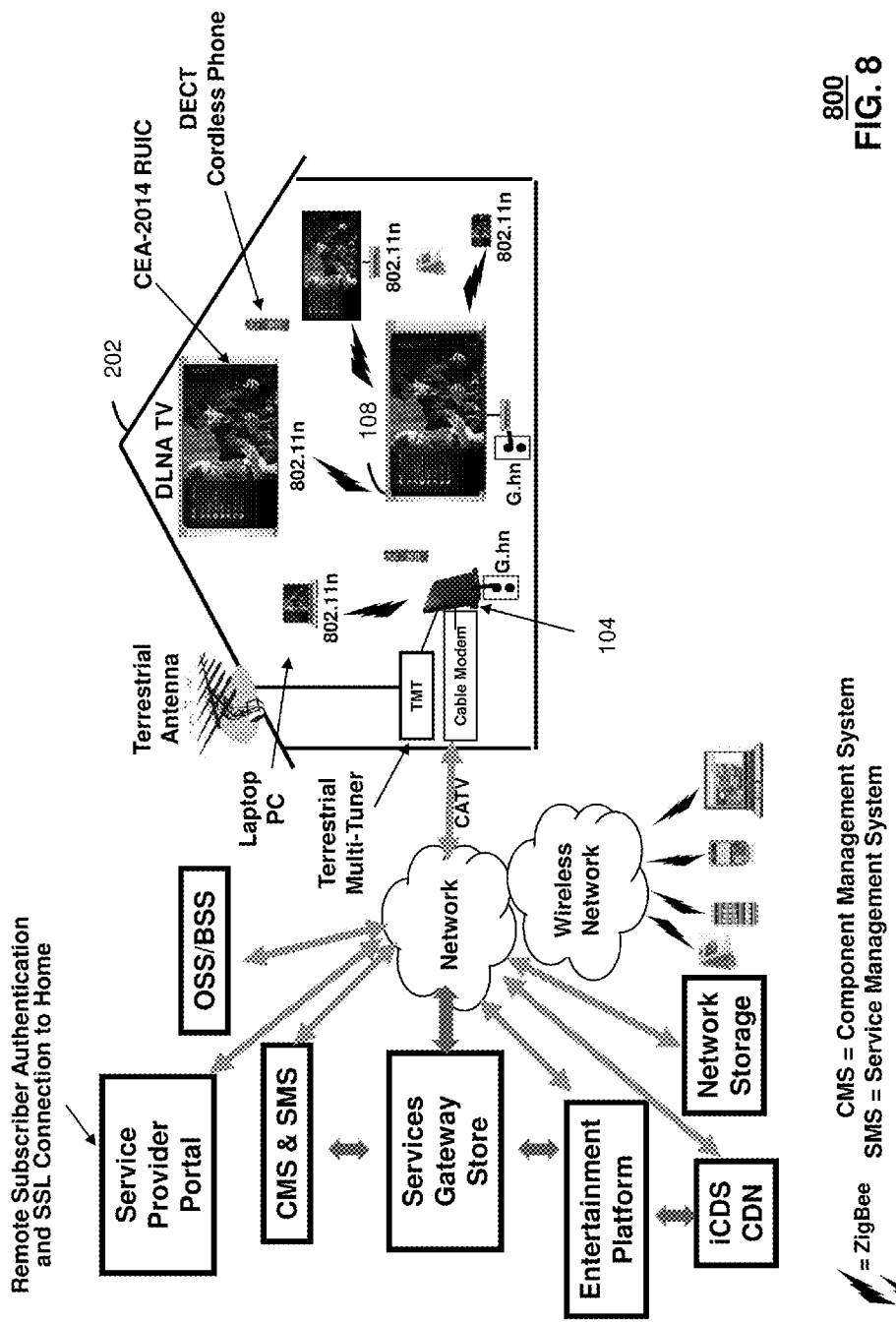

FIG. 8 depicts an illustrative embodiment of a communication system 800 employing an out-of-region Bring-Your-Own-Broadband, such as cable modem service, deployment of the services gateway 104. Communication system 800 can be overlaid or operably coupled with one or more of communication systems 100-300 as another representative embodiment of communication system 800. Multimedia content from a plurality of different service providers using a plurality of different delivery protocols can be delivered via the gateway 104 directly to one or more display devices 108 in the residence 202. In one embodiment, a separate terrestrial multi-tuner can be utilized between an antenna and the gateway 104. Communication between the gateway 104 and the display devices 108 can be via various means including hardwire, via Ethernet over Cat5e/Cat6 cable, HomePlug over powerline or G.hn protocol over powerline, coax or telephone wiring, or wireless 802.11 protocol. A java bundle or other resource bundle can be downloaded to the gateway 104. A shipping order can be automatically generated for equipment associated with a requested service and can be delivered to the requestor. The equipment can be detected once powered up or plugged into a power circuit of the building 202. Upon detection of the equipment, the requested service can be implemented, such as without the intervention of the user, through use of the gateway 104. The exemplary embodiments also contemplate other access technologies, including fiber-to-the-home and Long Term Evolution (LTE).

Figure 9:
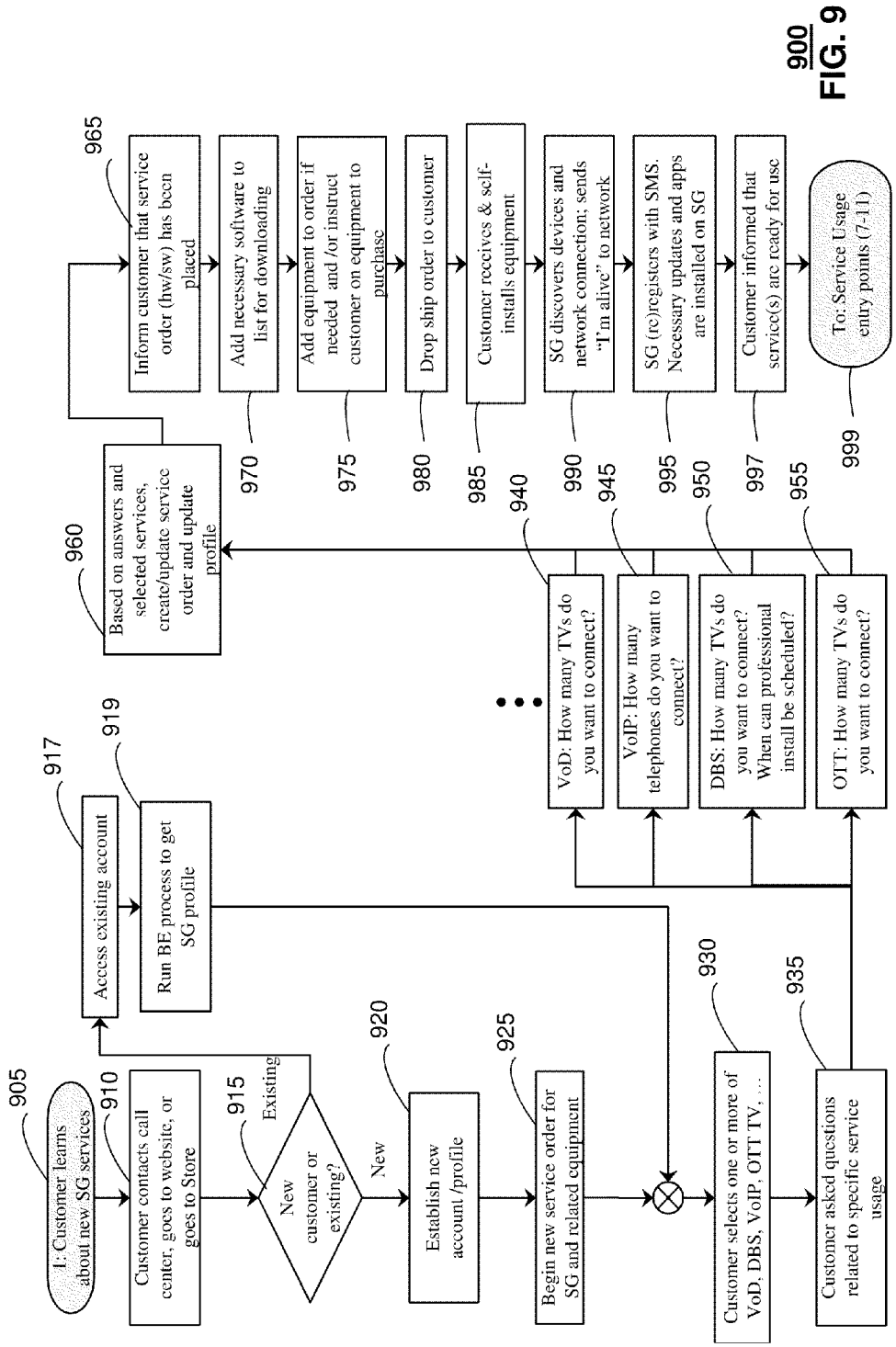
FIGS. 9-10 depict illustrative embodiments of methods operating in portions of the devices and systems of FIGS. 1-8.

FIG. 9 depicts an illustrative embodiment of a method 900 operating in portions of the devices and systems described herein and/or illustrated in FIGS. 1-8. Method 800 can begin with step 905 where a customer learns of a new service offered through the services gateway 104 and in step 910 contacts the service provider regarding the service. In steps 915, 920 and 925, a new profile can be established for a new customer and a new service order generated for same. Otherwise, in steps 915, 917 and 919, an existing profile is accessed. In steps 930, 935, 940, 945, 950 and 955, the service provider can obtain various information from the customer regarding the desired service. In steps 960 and 965, a service order is generated and the customer is notified of same. In steps 970 and 975, downloading of the associated applications for the service can be performed, such as without knowledge of the customer. The download can be performed according to various schedules, including network load, user usage patterns (e.g., based on monitored behavior or scheduled events), and other criteria. In step 980, the equipment associated with the services can be drop shipped to the customer and in step 985 installation of the equipment can be performed, including self-installation. In steps 990, 995 and 997, detection of the equipment and/or downloaded software by the gateway can be performed. In one embodiment, software updates can be performed at the time of the equipment installation. In another embodiment, the software download for the particular service can be performed after the equipment is installed and detected. Method 900 then continues in step 999 to the service usage entry points.

Figure 10:
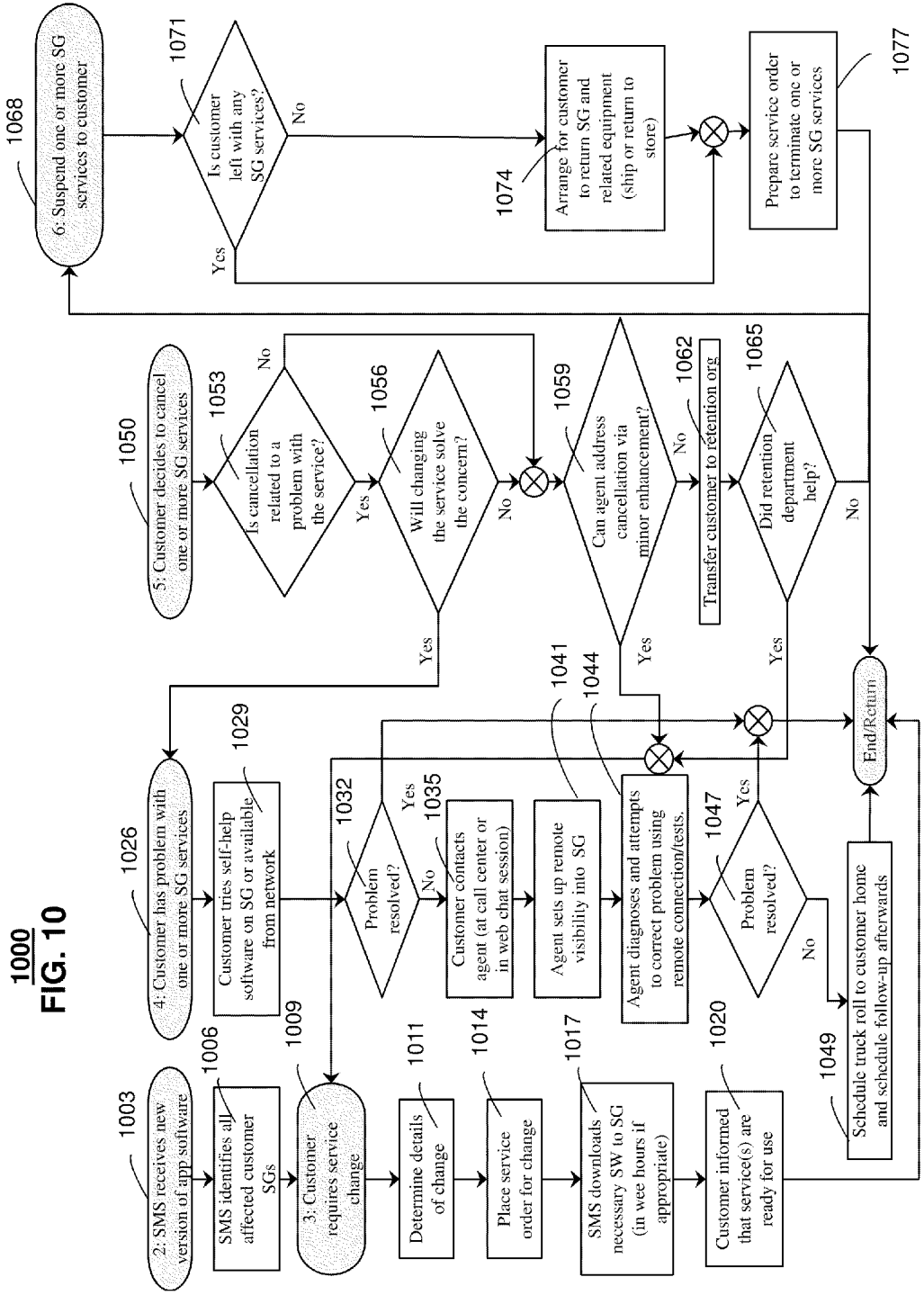

Method 1000 depicted in FIG. 10 is a continuation of method 900 of FIG. 9 and includes step 1003 where the Service Management System receives a new version of software for a particular service. In steps 1006, 1009, 1011, 1014, 1017 and 1020, all affected customers can be identified, downloads can be performed, and customer notification can be performed. In steps 1026 and 1029, issues arising with a service can be initially handled via self-help software available on the gateway or available through the network. For example, self-help software can be an application that is used for diagnosing an issue and providing instructions to a customer without provider personnel intervention. If the issue is not resolved, then in steps 1035, 1041 and 1044, a provider agent can apply remote diagnosis and correction to the customer's home network. The remote diagnosis and correction can be based on remote testing, video conferencing with the customer and other techniques. If in step 1047, this does not resolve the issue, then in step 1049 a service visit can be performed.

In steps 1050 and 1053, where a customer cancels a service, it can be determined whether the cancellation is related to an issue with the service. In steps 1056, 1059, 1062 and 1065, it can be determined whether changing the service, equipment enhancement or contacting the retention personnel can resolve the cancellation issue. In steps 1068 and 1071, where a service is being suspended, it can be determined whether the customer has any services remaining. In steps 1074 and 1077, equipment return can be arranged and the corresponding service orders can be generated.

Figure 11:
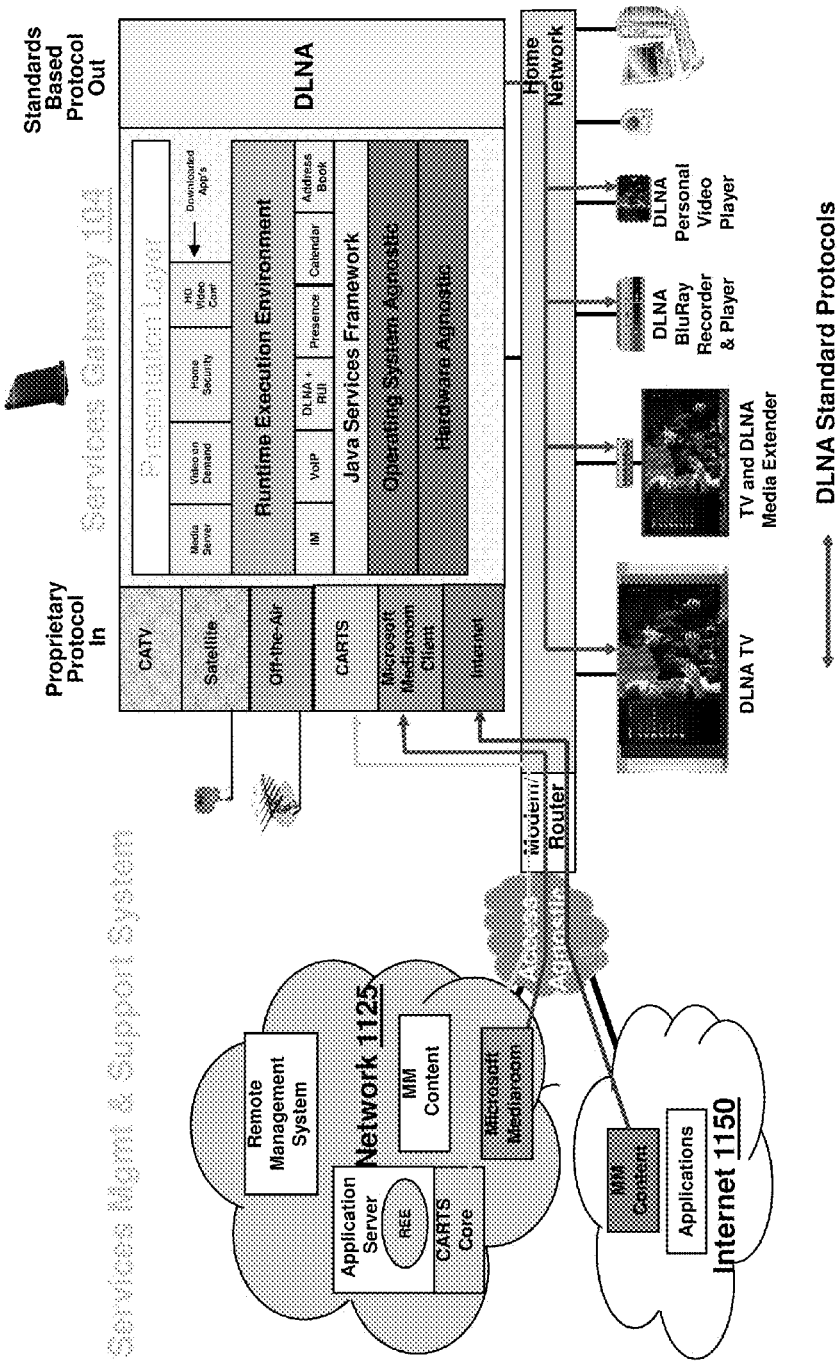
FIG. 11 depicts an illustrative embodiment of a communication system that provides media services.

FIG. 11 depicts an illustrative embodiment of a communication system 1100 employing the gateway 104 for delivery of media content from a plurality of service providers. Communication system 1100 can be overlaid or operably coupled with one or more of communication systems 100-300 and 600-800 as another representative embodiment of communication system 1100. In one embodiment, multimedia content from a plurality of different service providers using a plurality of different delivery protocols can be delivered via the gateway 104 directly to one or more display devices 108 in the residence 202, which can bypass any existing set top boxes in the building 202. In one embodiment, the media content is converted to and delivered via DLNA protocol or format. Communication between the gateway 104 and the display devices 108 can be via various means including hardwire, via Ethernet over Cat5e/Cat6 cable, HomePlug over powerline or G.hn protocol over powerline, coax or telephone wiring via Ethernet over Cat5e/Cat6 cable, HomePlug over powerline or G.hn protocol over powerline, coax or telephone wiring, or wireless 802.11 protocol, or wireless 802.11 protocol.

In system 1100, the gateway 104 can receive data formatted using proprietary protocols, such as protocols for CATV, Satellite, and Off-the-air, and can provide the data to display devices using DLNA standards or another standard. In one embodiment, system 1100 can implement Digital Transmission Content Protection (DTCP-IP) in delivering and presenting media content. For instance, media content received at the gateway 104 can be formatted using DTCP-IP so that the media content can be selectively presented at one or more of the display devices 108. DTCP-IP can be utilized so that the media content can only be presented under the control of the service provider.

FIG. 12 depicts an illustrative embodiment of a display device 108 having a Graphical User Interface (GUI) 1225. The GUI 1225 can be generated by the gateway 104 and presented at each of the display devices 108 throughout the building 202. In one embodiment, the GUI 1225 can be adjusted by the receiving display device to better suit presentation on a particular display device, such as adjusting the resolution for display on a cell phone. The GUI 1225 can include a first window 1240 in which media content continues to be presented at the display device 108 and a second window 1245, which includes options for obtaining information and otherwise manipulating services provided by the gateway 104, which can include broadcast programming, recorded TV, VoD, internet, and/or applications.

In one embodiment, the GUI 1225 can present real-time data 1250 corresponding to services being utilized and/or consumed by the consumer. For instance, the data 1250 can be a financial counter that displays a current cost to the consumer for the services that are being provided. The services can be from one or more service providers and can be one or more types of different services. In one embodiment, the consumer can select the types of services that are to be included in the presentation of the financial counter. For example, a consumer can elect to display an aggregate financial counter 1285 for telephone, water, power and internet access that is being provided to the building 202. The financial calculator can be based on data that is generated in whole or in part by remote monitoring. For example, data can be gathered at the building 202 and transmitted from the gateway 104 to the particular service provider so that billing data can be generated. The billing data can then be transmitted back to the gateway 104 and presented in the financial counter of GUI 1225.

In another embodiment, the gateway 104 can determine the financial data without intervention on the part of the service provider. For instance, power consumption can be monitored from a power meter of the building 202 and transmitted, such as through a transmitter affixed to the meter using ZigBee protocol, to the gateway 104 where the financial counter is generated by the gateway for presentation in GUI 1225. The monitored data can also be transmitted from the gateway 104 to the service provider so that the service provider maintains a record of the billing records. The financial counter can be restarted for a new billing period and/or based upon receipt of payment for the services.

In one embodiment, the GUI 1225 can be used to provide conservation information to the consumer to assist the consumer in reducing costs for the services being provided or otherwise making the provided services more cost effective. For instance, the GUI 1225 can indicate times when services are at a lower cost, such as indicating to the consumer that they can raise the temperature of their air conditioning during peak times to reduce energy costs. In another embodiment, non-financial data can be presented in the GUI 1225, such as consumption, including broken down by device or device type.

In another embodiment, third party services can be provided through the gateway 104 without the identity of the third party being revealed to the consumer, including through charging an account of the consumer associated with the gateway (e.g., a telephone account, IPTV account, Internet access account) for the third party service. As described above, the third party service can be of various types including telecommunication services and non-telecommunication services. In one embodiment, the third party services can include purchase of an application (and/or equipment associated with the application) via the gateway 104, with or without the identity of the third party being revealed and with or without charging an account associated with the gateway.

In one embodiment, the GUI 1225 can include an interface 1275 that allows for control over equipment or devices that have been purchased by the customer. For example, interface 1275 can provide control over appliances that are in communication with the gateway 205 and/or directly in communication with the display device presenting the GUI 1225. For instance in a home automation example, the customer can utilize interface 1275 to schedule operation of the air-conditioning system, refrigeration system and sprinkler system, where each of these systems has transceivers for receiving commands generated at the interface, such as through the gateway 104.

Upon reviewing the aforementioned embodiments, it would be evident to an artisan with ordinary skill in the art that said embodiments can be modified, reduced, or enhanced without departing from the scope and spirit of the claims described below. In one embodiment, the remote monitoring can be associated with security services for the building 202.

The gateway 104 can transmit data associated with the security of the residence 202, such as an alarm at the residence being triggered. The third party security service can utilize the gateway 104 to obtain additional data associated with the security, such as recorded video from a security camera that is stored in a memory of the home network. In another example, the third party security provider can adjust the service using the gateway 104 in response to receipt of the security data. For instance, the gateway 104 can be used to communicate control signals from the security service provider to video cameras at the residence 202 (such as rotating the cameras to adjust the view, automatically locking doors, and so forth).

In one embodiment, the applications downloaded to the gateway 104 can be removed from a memory of the gateway, or elsewhere in the home network of the building 202, when the service is cancelled. In another embodiment, the downloaded applications can be disabled when the service is cancelled.

In another embodiment, the delivery of the media content from different service providers can be aggregated to provide a uniform presentation. In another embodiment, the uniform presentation can be performed without identifying the service provider(s) delivering the media content. For instance, broadcast programming can be obtained from different service providers but presented at channels having similar GUI's (e.g., information preview windows and so forth). In another embodiment, the source of the media content can be indicated in an EPG or the like, although the present disclosure contemplates the presentation of the media content being performed via a uniform setting without identifying the various service providers that are the source of the particular content.

The exemplary embodiments contemplate being implemented in response to upgrading the services offered on the gateway when patches to issues and/or new versions with added functionality become available.

Other suitable modifications can be applied to the present disclosure without departing from the scope of the claims below. Accordingly, the reader is directed to the claims section for a fuller understanding of the breadth and scope of the present disclosure.

FIG. 13 depicts an exemplary diagrammatic representation of a machine in the form of a computer system 1300 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 1300 may include a processor 1302 (e.g., a central processing unit (CPU), a graphics processing unit (GPU, or both), a main memory 1304 and a static memory 1306, which communicate with each other via a bus 1308. The computer system 1300 may further include a video display unit 1310 (e.g., a liquid crystal display (LCD), a flat panel, a solid state display, or a cathode ray tube (CRT)). The computer system 1300 may include an input device 1312 (e.g., a keyboard), a cursor control device 1314 (e.g., a mouse), a disk drive unit 1316, a signal generation device 1318 (e.g., a speaker or remote control) and a network interface device 1320.

The disk drive unit 1316 may include a machine-readable medium 1322 on which is stored one or more sets of instructions (e.g., software 1324) embodying any one or more of the methodologies or functions described herein, including those methods illustrated above. The instructions 1324 may also reside, completely or at least partially, within the main memory 1304, the static memory 1306, and/or within the processor 1302 during execution thereof by the computer system 1300. The main memory 1304 and the processor 1302 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 1324, or that which receives and executes instructions 1324 from a propagated signal so that a device connected to a network environment 1326 can send or receive voice, video or data, and to communicate over the network 1326 using the instructions 1324. The instructions 1324 may further be transmitted or received over a network 1326 via the network interface device 1320.

While the machine-readable medium 1322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A gateway, comprising:
  a memory that stores instructions; and
  a processor coupled with the memory, wherein responsive to executing the instructions, the processor performs operations comprising:
    receiving media content comprising first media content and second media content, the first media content being received from a first system of a first service provider, the second media content being received from a second system of a second service provider, wherein the media content is received from the first and second systems by the processor using different transport protocols, wherein the processor is located at a user premises, wherein the first media content is received from the first system over a first access network managed by the first service provider via a hardwire connection with the processor, and wherein the second media content is received from the second system over a second access network managed by the second service provider via a wireless connection without utilizing the first access network;
    reformatting the media content to generate reformatted media content that is based on a standard protocol for a plurality of display devices at the user premises, wherein the standard protocol defines a common format for each of the plurality of display devices;
    providing the reformatted media content from the processor to the plurality of display devices at the user premises by selectively bypassing a media processor, wherein the bypassing comprises providing the reformatted media content from the processor to the plurality of display devices via a communication path that does not include the media processor;
    receiving a request for a service associated with a third service provider, the request being received at the processor;
    receiving an application resource bundle at the processor to enable the service, the application resource bundle being received from a server associated with one of the first or second systems, wherein the server is not associated with the third service provider;
    enabling the service without providing an identification of the third service provider to the media processor;
    determining an incompatibility between additional media content and the media processor; and
    reformatting the additional media content based the incompatibility to generate a reformatted additional media content according to the standard protocol.

2. The gateway of claim 1, wherein the processor provides a graphical user interface for presentation on one of the plurality of display devices, wherein the graphical user interface displays and adjusts a cost for use of the service associated with the third service provider.

3. The gateway of claim 2, wherein the graphical user interface displays and adjusts the cost for use of the service without identifying the third service provider.

4. The gateway of claim 2, wherein the cost is separated for a plurality of devices associated with the third service provider.

5. The gateway of claim 1, wherein a purchase of the service associated with the third service provider is charged to an account associated with one of the first and second service providers without providing the identification of the third service provider to the account.

6. The gateway of claim 1, wherein the first service provider is one of an Internet Protocol television service provider or a cable television service provider, wherein the second service provider is one of a satellite television service provider or an off-the-air terrestrial service provider.

7. The gateway of claim 1, wherein the service associated with the third service provider comprises one of a utility service or medical monitoring service, and
  wherein the operations further comprise providing a graphical user interface for presentation on the plurality of display devices, wherein the graphical user interface indicates financial data indexed by one of the plurality of display devices that uses the service associated with the third service provider.

8. The gateway of claim 1, wherein the operations further comprise providing the media content from the processor to the plurality of display devices by selectively bypassing the media processor by:
  transmitting a first portion of the media content to a first display device of the plurality of display devices utilizing a power line in the user premises; and
  transmitting a second portion of the media content to a second display device of the plurality of display devices utilizing a wireless connection between the processor and the second display device.

9. The gateway of claim 1, wherein the operations further comprise:
  removing the application resource bundle from the memory responsive to the service being cancelled or suspended;
  receiving the additional media content from first and second systems of first and second service providers, wherein the first and second systems deliver the additional media content to the processor using different transport protocols; and
  providing the reformatted additional media content from the processor to the media processor.

10. A non-transitory, machine-readable storage medium, comprising instructions, wherein responsive to executing the instructions, a processor of a gateway performs operations comprising:
  receiving media content at the gateway of a user premises, the media content comprising first media content and second media content, the first media content being received from a first system of a first service provider that manages a first access network, the second media content being received from a second system of a second service provider that manages a second access network, wherein the first media content is received over the first access network via a hardwire connection with the gateway, wherein the second media content is received at the user premises over the second access network via a wireless connection without utilizing the first access network;
  determining, at the gateway, an incompatibility between the media content and a media processor in communication with the gateway;
  reformatting the media content to generate reformatted media content that is based on a standard protocol for a plurality of display devices at the user premises, wherein the standard protocol defines a common format for each of the plurality of display devices;
  providing the reformatted media content from the gateway to a display device by selectively bypassing the media processor responsive to the determining of the incompatibility, wherein the bypassing comprises providing the media content from the gateway to the display device via a communication path that does not include the media processor;
  receiving at the gateway a request for a service associated with a third service provider;
  enabling the service without identifying the third service provider by utilizing an application resource bundle received from a server associated with one of the first or second systems, wherein the server is not associated with the third service provider;
  determining an additional incompatibility between additional media content and the media processor;
  reformatting the additional media content based the additional incompatibility to generate a reformatted additional media content according to the standard protocol; and
  charging a purchase of the service to an account associated with one of the first and second service providers without providing an identification of the third service provider.

11. The non-transitory, machine-readable storage medium of claim 10, wherein the media content is received from the first and second service providers by the gateway using different transport protocols.

12. The non-transitory, machine-readable storage medium of claim 10, wherein the operations further comprise providing the media content from the gateway to a plurality of display devices by selectively bypassing the media processor by:
  transmitting a first portion of the media content to a first display device of the plurality of display devices utilizing a power line in the user premises; and
  transmitting a second portion of the media content to a second display device of the plurality of display devices utilizing a wireless connection between the gateway and the second display device.

13. The non-transitory, machine-readable storage medium of claim 10, wherein the operations further comprise providing a graphical user interface for presentation on a plurality of display devices, wherein the graphical user interface displays and adjusts a cost for use of the service associated with the third service provider.

14. The non-transitory, machine-readable storage medium of claim 10, wherein the service associated with the third service provider is not a telecommunication service.

15. The non-transitory, machine-readable storage medium of claim 11, wherein the operations further comprise disabling the application resource bundle or deleting the application resource bundle from a memory of the gateway in response to a cancellation or suspension of the service.

16. A method, comprising:
  receiving, by a system comprising a processor, media content at a gateway of a user premises, the media content comprising first media content and second media content, the first media content being received from a first system of a first service provider that manages a first access network, the second media content being received from a second system of a second service provider that manages a second access network, wherein the first media content is received from the first system over the first access network via a hardwire connection with the gateway, wherein the second media content is received from the second system at the user premises over the second access network via a wireless connection without utilizing the first access network, wherein the media content is received from the first and second service providers using different transport protocols;
  determining, by the system, an incompatibility between the media content and a media processor in communication with the gateway;
  reformatting the media content to generate reformatted media content that is based on a standard protocol for a plurality of display devices at the user premises, wherein the standard protocol defines a common format for each of the plurality of display devices;
  providing, by the system, the reformatted media content from the gateway to a display device by selectively bypassing the media processor responsive to the determining of the incompatibility, wherein the bypassing comprises providing the media content from the gateway to the display device along a communication path that does not include the media processor;

receiving, by the system, a request for a service associated with a third service provider, the request being received at the gateway;

receiving, by the system, an application resource bundle at the gateway to enable the service, the application resource bundle being received from a server associated with the first service provider, wherein the server is not associated with the third service provider;

enabling, by the system, the service using the gateway;

in response to a cancellation or suspension of the service received at the gateway, disabling, by the system, the application resource bundle or deleting the application resource bundle from a memory of the gateway;

receiving additional media content from first and second systems of first and second service providers, wherein the first and second systems deliver the additional media content to the processor using different transport protocols;

determining an additional incompatibility between the additional media content and the media processor;

reformatting the additional media content based on the determining of the additional incompatibility to generate a reformatted additional media content according to the standard protocol; and providing the reformatted additional media content from the processor to the media processor.

17. The method of claim 16, further comprising enabling the service without providing an identification of the third service provider.

18. The method of claim 16, further comprising providing a graphical user interface from the gateway for presentation on the display device, wherein the graphical user interface displays and adjusts a cost for use of the service associated with the third service provider.

19. The method of claim 16, wherein a purchase of the service associated with the third service provider is charged to an account associated with the first service provider without providing an identification of the third service provider to the account.

20. The method of claim 18, further comprising:

receiving data at the gateway from a device associated with the third service provider, the device being customer premises equipment; and determining the cost at the gateway based on the data.

* * * * *